(12) United States Patent
Thomsen (10) Patent No.: US 11,361,630 B1
(45) Date of Patent: Jun. 14, 2022

(54) IDENTIFYING AND LOGGING MOBILE DEVICES POSING SECURITY THREATS

(71) Applicant: BANK OF AMERICA CORPORATION, Charlotte, NC (US)

(72) Inventor: Kevin P. Thomsen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/953,654

(22) Filed: Nov. 20, 2020

(51) Int. Cl.
| G07F 19/00 | (2006.01) |
| H04W 84/18 | (2009.01) |
| H04W 60/00 | (2009.01) |
| G08B 13/196 | (2006.01) |

(52) U.S. Cl.
CPC .......... G07F 19/207 (2013.01); G07F 19/209 (2013.01); G08B 13/19613 (2013.01); H04W 60/00 (2013.01); H04W 84/18 (2013.01)

(58) Field of Classification Search
CPC ................ G07F 19/207; G07F 19/209; G08B 13/19613; H04W 60/00; H04W 84/18
See application file for complete search history.

(56) References Cited

U.S. PATENT DOCUMENTS

| 8,295,851 | B2 | 10/2012 | Finnegan et al. |
| 8,413,209 | B2 | 4/2013 | Aldera et al. |
| 8,624,727 | B2 | 1/2014 | Saigh et al. |
| 8,665,089 | B2 | 3/2014 | Saigh et al. |
| 8,732,827 | B1 | 5/2014 | Zhukov et al. |
| 8,971,932 | B2 | 3/2015 | Mapes |
| 8,989,775 | B2 | 3/2015 | Shaw |
| 9,087,346 | B2 | 7/2015 | Hartzell et al. |
| 9,119,065 | B2 | 8/2015 | Hawkes et al. |
| 9,185,093 | B2 | 11/2015 | Gupta et al. |
| 9,286,471 | B2 | 3/2016 | Qureshi et al. |
| 9,374,369 | B2 | 6/2016 | Mahaffey et al. |
| 9,398,169 | B2 | 7/2016 | Mohammed et al. |
| 9,558,645 | B2 | 1/2017 | Layson |
| 9,584,252 | B1 | 2/2017 | Salyers et al. |
| 9,813,433 | B2 | 11/2017 | McDaid et al. |

(Continued)

OTHER PUBLICATIONS

Wikipedia; IMSI-catcher; https://en.wikipedia.org/wiki/IMSI-catcher; page last edited Nov. 18, 2020.

(Continued)

Primary Examiner — Laura A Gudorf (57) ABSTRACT

A system includes a database, a sensor, and a processor. The sensor obtains a mobile device identifier transmitted by a mobile device located within a range of the sensor. The processor receives the identifier from the sensor and stores the identifier and a first time when the mobile device was located within the range in a log. The processor receives an indication that an event associated with a security breach took place within the sensor range at a particular time that is within a tolerance of the first time. In response, the processor determines, based at least in part on the particular time and the presence of the identifier and first time in the log, that a user of the mobile device is associated with the event. In response, the processor stores the identifier in the database to indicate that the mobile device is associated with a security threat.

20 Claims, 4 Drawing Sheets

(56) References Cited

U.S. PATENT DOCUMENTS

| | | |
|---|---|---|
| 9,860,731 B1 | 1/2018 | Noonan |
| 9,892,608 B2 | 2/2018 | Layson |
| 9,922,048 B1 | 3/2018 | Milliorn |
| 9,949,130 B2 | 4/2018 | Ophir et al. |
| 10,003,685 B2 | 6/2018 | Noonan et al. |
| 10,033,751 B2 | 7/2018 | Donnelly et al. |
| 10,257,186 B2 | 4/2019 | Enrique Salpico |
| 10,271,214 B1 | 4/2019 | Noonan et al. |
| 10,594,987 B1 * | 3/2020 | Nixon .................. H04W 4/023 |
| 10,673,865 B2 | 6/2020 | Salkini |
| 2003/0182214 A1 | 9/2003 | Taylor |
| 2007/0112713 A1 | 5/2007 | Seaman et al. |
| 2008/0094230 A1 | 4/2008 | Mock et al. |
| 2010/0291906 A1 | 11/2010 | DeLuca et al. |
| 2012/0084288 A1 | 4/2012 | Abdul-Razzak et al. |
| 2014/0004817 A1 | 1/2014 | Horton et al. |
| 2014/0004829 A1 | 1/2014 | Rieger et al. |
| 2014/0066028 A1 * | 3/2014 | Miller .................. H04W 64/00 455/414.1 |
| 2014/0200929 A1 | 7/2014 | Fitzgerald et al. |
| 2015/0140962 A1 | 5/2015 | Mapes |
| 2015/0230072 A1 | 8/2015 | Saigh et al. |
| 2016/0063085 A1 | 3/2016 | DeKock |
| 2017/0243251 A1 | 8/2017 | Weiser et al. |
| 2019/0191359 A1 | 6/2019 | Noonan et al. |
| 2020/0020160 A1 | 1/2020 | Tov et al. |

OTHER PUBLICATIONS

Thomsen, Kevin P.; Monitoring for Security Threats Associated With Mobile Devices That Have Been Identified and Logged; U.S. Appl. No. 16/953,722, filed Nov. 20, 2020.

* cited by examiner

IDENTIFYING AND LOGGING MOBILE DEVICES POSING SECURITY THREATS

TECHNICAL FIELD

The present disclosure relates generally to information storage and retrieval, and more particularly, to identifying and logging mobile devices posing security threats.

BACKGROUND

Mobile devices are typically associated with one or more identifiers. For example, a mobile device may be associated with an International Mobile Subscriber Identity (IMSI), an International Mobile Equipment Identity (IMEI), a phone number, and/or a media access control (MAC) address.

SUMMARY

Based on the popularity of mobile devices, it may be possible to identify and track an individual's movements using the mobile device identifier assigned to his/her mobile device. As an example, by capturing the mobile device identifiers belonging to mobile devices carried by individuals as they enter an institution, the institution may be able to generate a log of individuals who have visited the institution, even if those individuals did not otherwise provide identification information to the institution. Maintaining such a log may be desirable to enhance the security of the institution. For example, after a security breach has been detected by the institution, the institution may consult the log to identify the mobile device that was likely carried by the perpetrator of the breach. Once identified, the institution may flag this mobile device identifier as posing a security threat to the institution.

This disclosure contemplates a security system that uses mobile device identifiers to identify mobile devices that pose security threats to an institution. In particular, the system includes a sensor that is configured to obtain mobile device identifiers from mobile devices that are located within a range of the sensor. This range may be selected to cover the physical area occupied by the institution and/or the area surrounding equipment belonging to the institution. When a mobile device enters the sensor's range, the sensor obtains an identifier belonging to the mobile device. In certain embodiments, the system stores this identifier in a log, along with the times at which the mobile device was located within the range of the sensor and/or the locations of the mobile device within the range. When the institution identifies a security breach that took place (1) at a given location and at a given time within the institution and/or (2) at a given time at or around a piece of equipment belonging to the institution, the system consults the log to identify a mobile device that was present at the time and place of the security breach (and accordingly, was likely in the possession of the perpetrator). The system then stores the identifier belonging to this mobile device in a database of mobile device identifiers that are associated with security threats. This database may be owned by the institution and/or shared among a collection of institutions, and may be used to identify potential security threats to the institutions. For example, in certain embodiments, after the sensor obtains an identifier belonging to a mobile device that has entered the range of the sensor, the system determines whether or not the identifier is stored in the database. If the system determines that the identifier is stored in the database, the system initiates a security protocol to help protect the institution against any security threats that the owner of the mobile device may pose to the institution. For example, in certain embodiments, the system (1) alerts a law enforcement agency of the presence of the mobile device owner within the institution, (2) transmits a message instructing an employee to decline to process any transactions initiated by the owner of the mobile device, (3) remotely locks equipment located in the vicinity of the mobile device, and/or (4) performs any other activity designed to protect the institution from security threats posed by the owner of the mobile device. Certain embodiments of the security system are described below.

According to one embodiment, a system includes a database, a sensor, and a hardware processor communicatively coupled to the sensor. The sensor has a range and is configured to obtain an identifier transmitted by a mobile device when the mobile device is located within the range. The identifier is assigned to the mobile device. The hardware processor receives the identifier from the sensor. The processor also stores the identifier and a first time in a log. The mobile device was located within the range of the sensor at the first time. The processor additionally receives an indication that an event associated with a security breach took place within the range of the sensor at a particular time. The particular time is within a given tolerance of the first time. In response to receiving the indication, the processor determines, based at least in part on the particular time and the presence of the identifier and the first time in the log, that a user of the mobile device is associated with the event. In response to determining that the user of the mobile device is associated with the event, the processor stores the identifier in the database. The presence of the identifier in the database indicates that the user of the mobile device is associated with a security threat.

According to another embodiment, a system includes a database, a sensor, and a hardware processor communicatively coupled to the sensor. The database stores an identifier assigned to a mobile device. The presence of the identifier in the database indicates that a user of the mobile device is associated with a security breach. The mobile device is configured to transmit the identifier over a wireless network. The sensor has a range and is configured to obtain the identifier transmitted by the mobile device when the mobile device is located within the range. The hardware processor receives the identifier from the sensor. The processor also determines that the identifier is stored in the database. In response to determining that the identifier is stored in the database, the processor initiates a security protocol.

Certain embodiments provide one or more technical advantages. As an example, an embodiment includes a sensor that acts as a relay between a mobile device and a network base station. The sensor may intercept transmissions sent from the mobile device to the network base station, extract information from the transmissions, and then send the transmissions on to the base station. In this manner, the sensor may obtain a mobile device identifier associated with the mobile device from a transmission sent by the mobile device, without disrupting communications sent/received by the mobile device. As another example, an embodiment stores mobile device identifiers obtained from mobile devices that were located within the range of a sensor according to a set of time intervals, based on the times at which the mobile device identifiers were obtained. This enables the system to identify those mobile devices located within the range of the sensor at a given time in an efficient manner. As a further example, an embodiment uses a machine learning algorithm to automatically identify features within videos and/or images that are indicative of a security breach. The security tool described in the present disclosure may particularly be integrated into a practical application of a security system for use by an institution, which automatically identifies mobile devices that are located in the vicinity of the institution and that pose security threats to the institution and, in response to such identification, automatically initiates security protocols.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1A through 3 of the drawings, like numerals being used for like and corresponding parts of the various drawings.

I. System Overview

Figure 1A:
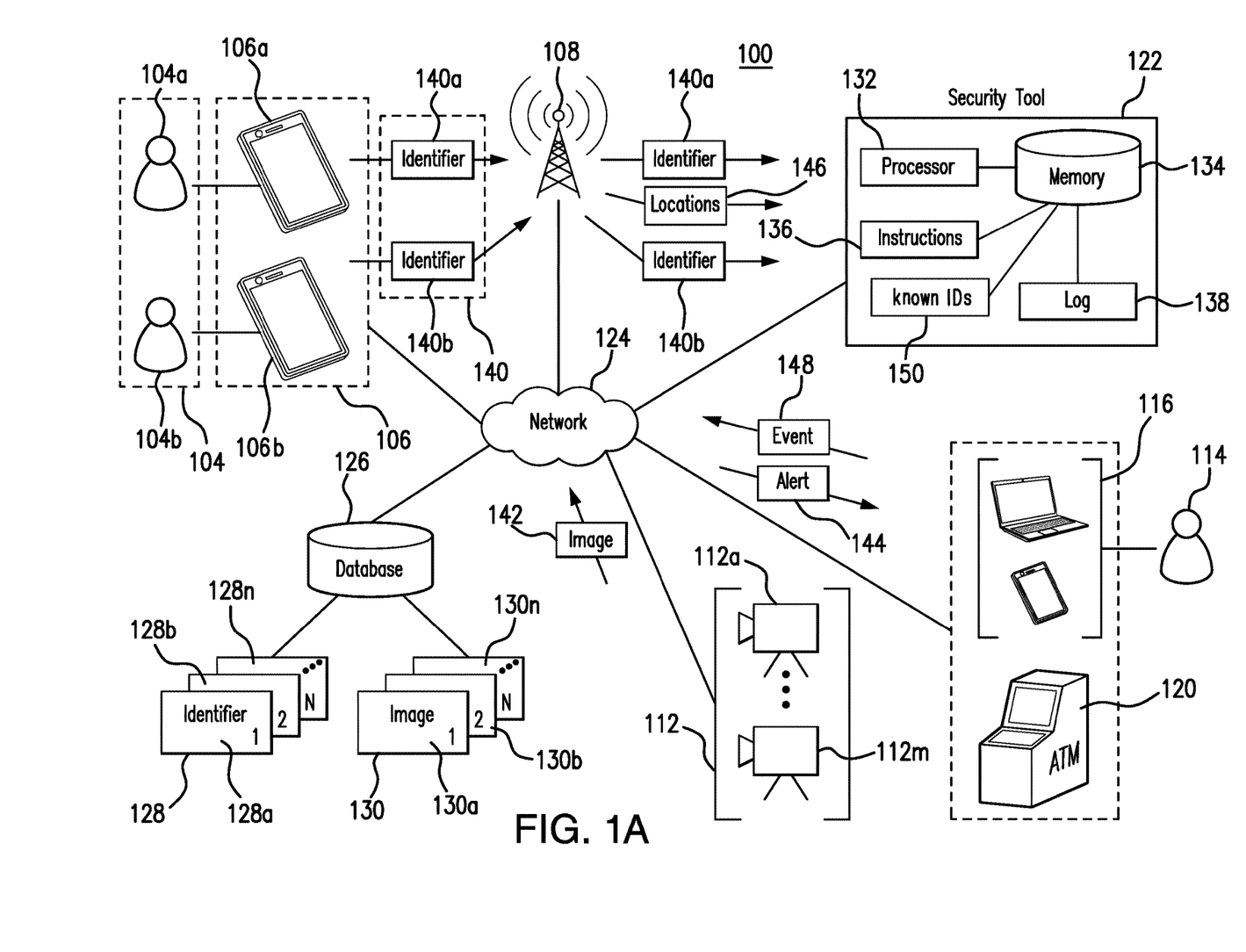
FIG. 1A illustrates an example security system.
Figure 1B:
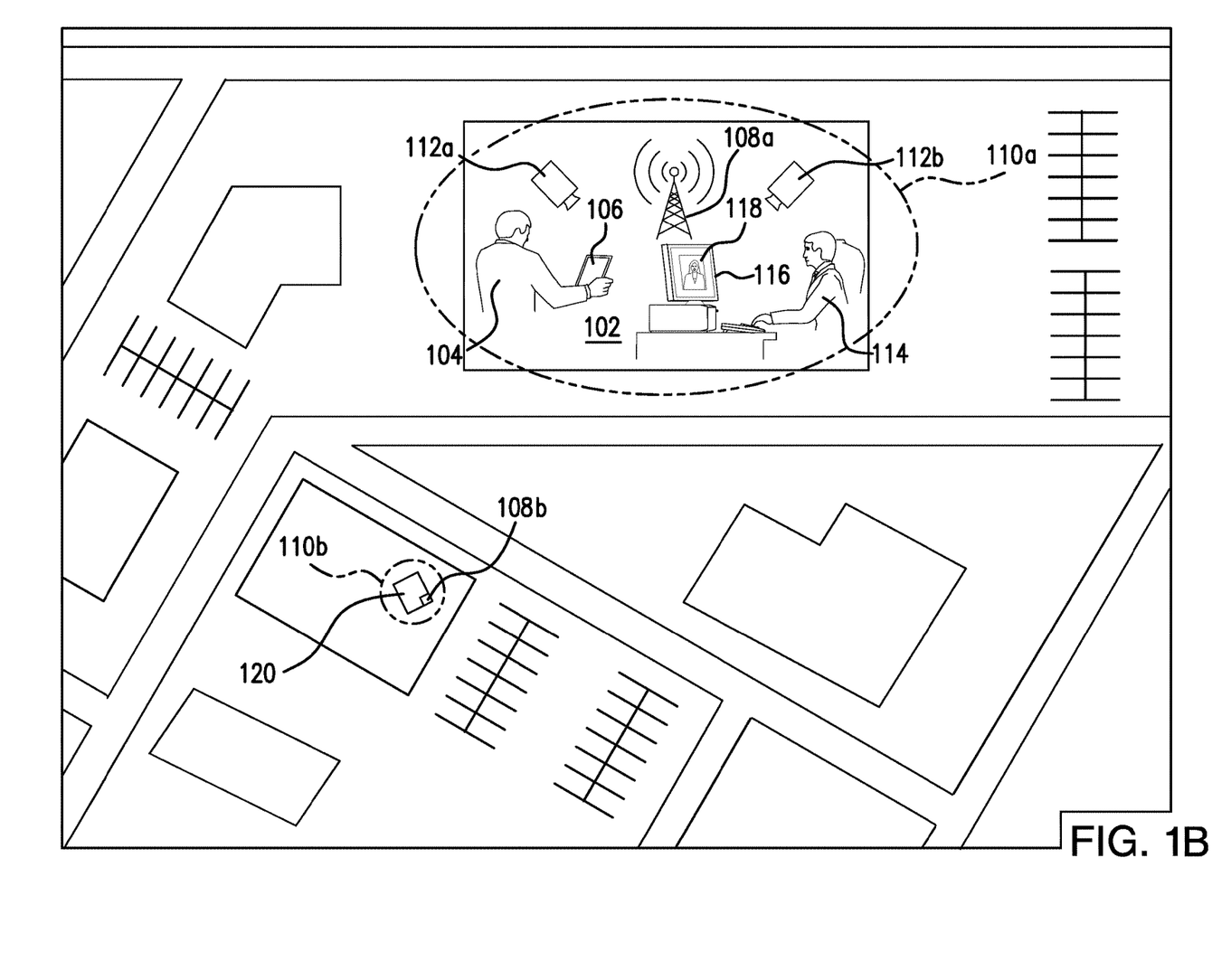
FIG. 1B illustrates components of the security system of FIG. 1A positioned within an example institution.

FIGS. 1A and 1B illustrate an example system 100 that includes security tool 122, mobile device user(s) 104, mobile device(s) 106, sensor(s) 108, camera(s) 112, notification device user(s) 114, notification device(s) 116, automated teller machine(s) 120, network 124, and database 126. FIG. 1A illustrates the relationships between the various components of system 100, while FIG. 1B illustrates certain of the components of system 100 as located within an example institution 102. Generally, in a first mode of operation, security tool 122 generates a database 126 that includes a set of mobile device identifiers 128a through 128n that belong to mobile devices 106 that are associated with security threats to institution 102. In a second mode of operation, security tool 122 (1) determines whether a mobile device 106 that is located within a range of sensor 108 is associated with a security threat to institution 102 (by obtaining the mobile device identifier 140 belonging to the mobile device and determining whether or not this identifier exists within database 126), and (2) in response to identifying a mobile device 106 that is associated with a security threat, initiates a security protocol designed to protect institution 102 from the security threat. While described throughout this disclosure as operating according to both these first and second modes of operation, this disclosure contemplates that security tool 122 may alternatively be configured to operate according to the first mode of operation but not the second mode of operation, or according to the second mode of operation but not the first mode of operation. Further details of these two modes of operation are presented below, as well as in the discussion of FIGS. 2 and 3.

Mobile devices 106 are used by users 104 while located on and/or attempting to join network 124. Each mobile device 106 is associated with an identifier 140. Identifier 140 may be used to identify mobile device 106. Identifier 140 may be a number, a set of alphanumeric characters, and/or any other information that may be used to identify mobile device 106. For example, identifier 140 may be an International Mobile Subscriber Identity (IMSI), an International Mobile Equipment Identity (IMEI), a phone number, a media access control (MAC) address, and/or any other suitable identifier. In certain embodiments, mobile device 106 transmits identifier 140 to network 124 and/or a component of network 124 while attempting to authenticate with network 124. For example, in certain embodiments, mobile device 106 transmits identifier 140 to a nearby cell tower belonging to network 124, while attempting to authenticate with network 124. In some embodiments, mobile device 106 transmits identifier 140 in response to a request for identifier 140 from a component of network 124 and/or a device located on network 124.

Mobile device 106 may be configured to join network 124 and/or attempt to authenticate with network 124 in any suitable manner. As an example, in certain embodiments in which network 124 is a cellular network, mobile device 106 may be configured to automatically identify a cell tower providing the strongest available signal and authenticate with that cell tower. As another example, in certain embodiments in which network 124 is a WiFi network, mobile device 106 may be configured to automatically join/attempt to join an available public WiFi network and/or a network 124 to which mobile device 106 has previously connected. As a further example, in certain embodiments, user 104 may instruct mobile device 106 to join network 124 (for example, by selecting network 124 from a list of available networks).

Mobile devices 106 include any appropriate devices for connecting to network 124 and/or communicating with components of system 100 over network 124. For example, mobile device 106 may be a telephone, a mobile phone, a laptop, a wireless or cellular telephone, a tablet, a server, an IoT device, and/or an automated assistant, among others. This disclosure contemplates mobile devices 106 being any appropriate device for sending and receiving communications over network 124 and which user 104 may carry on his/her person. Mobile device 106 may also include a user interface, such as a display, a microphone, keypad, or other appropriate terminal equipment usable by user 104. In some embodiments, an application executed by a processor of mobile device 106 may perform the functions described herein.

Sensor 108 is configured to obtain identifier 140, transmitted by mobile device 106, and to communicate identifier 140 to security tool 122. Sensor 108 is any device capable of obtaining identifier 140 while mobile device 106 is located within the range of the sensor. For example, as illustrated in FIG. 1B, sensor 108a is capable of obtaining identifier 140 when mobile device 106 is located within range 110a of sensor 108a, and sensor 108b is capable of obtaining identifier 140 when mobile device 106 is located within range 110b of sensor 108b. Sensor 108 may be configured to obtain identifier 140 in any suitable manner. As an example, in certain embodiments, sensor 108 is configured to intercept communications that include identifier 140, which are transmitted by mobile device 106 over network 124. As another example, in certain embodiments, sensor 108 is configured to transmit a request for identifier 140 to mobile device 106 and receive identifier 140 in response. As a further example, in certain embodiments, sensor 108 corresponds to a virtual base station designed to obtain identifier 140. When mobile device 106 is located within the range of the virtual base station 108, mobile device 106 authenticates to virtual base station 108 (because, for example, virtual base station 108 appears to mobile device 106 to be a cell tower that provides the strongest available signals) and begins transmitting messages to virtual base station 108. One or more of such messages may include identifier 140. For example, mobile device 106 may transmit identifier 140 to virtual base station 108 while attempting to authenticate with virtual base station 108 and/or in response to a request received from virtual base station 108. After mobile device 106 has established a connection with virtual base station 108, virtual base station 108 is configured to act as a relay between mobile device 106 and network 124, such that mobile device 106 does not experience any disruption in communication services.

In certain embodiments, sensor 108 may be configured to determine the locations 146 of mobile device 106 when mobile device 106 is located within the range of sensor 108. For example, sensor 108a may be able to determine the locations of mobile device 106 when mobile device 106 is located within range 110a of sensor 108a, and/or sensor 108b may be able to determine the locations of mobile device 106 when mobile device 106 is located within range 110b of sensor 108b. Locations 146 may correspond to any information about the position of mobile device 106 within range 110a/b of sensor 108a/b. As an example, locations 146 may indicate the distance of mobile device 106 from sensor 108. As another example, locations 146 may correspond to coordinates of mobile device 106 within range 110a/b. For example, an x-y coordinate system may overlay range 110a/b, and locations 146 may be measured relative to this coordinate system. As another example, range 110a/b may be divided into a set of subregions and locations 146 may indicate which of those subregions mobile device 106 was located in. As a further example, range 110a/b may include a set of landmarks, and locations 146 may indicate which of those landmarks mobile device 106 was located closest to. For example, locations 146 may indicate that mobile device 106 was located near a front entrance of institution 102 and a first teller desk within institution 102.

Sensor 108 may be configured to obtain and/or record locations 146 at any suitable times while mobile device 106 is located within the range of sensor 108. As an example, sensor 108 may obtain/record locations 146 at regular intervals while mobile device 106 is located within the range of sensor 108. As another example, sensor 108 may obtain/record locations 146 whenever the position of mobile device 106 within range 110a/b has changed by a given amount. For example, where locations 146 are measured relative to a coordinate system overlaid on top of range 110a/b, sensor 108 may record the time and the location of mobile device 106 with respect to this coordinate system whenever the location has changed by one meter as compared to the previous recorded location. Similarly, where locations 146 are measured relative to landmarks within institution 102, sensor 108 may record the time and the location of mobile device 106 whenever the landmark located nearest to mobile device 106 changes. For example, locations 146 may indicate that mobile device 106 was located near a front entrance of institution 102 at a first time and then moved to a first teller desk at a second time.

Sensor 108 may be configured to determine the locations 146 of mobile device 106 within the range of sensor 108 in any suitable manner. For example, in certain embodiments, sensor 108 may include multiple components located at different physical positions. Each component may be configured to determine the distance between itself and mobile device 106, based on a measured strength of signals transmitted by mobile device 106. These measured distances may then be used to triangulate the location of the mobile device.

Cameras 112 are configured to capture images and/or video 142 of users 104, when users 104 are located within range 110a/b of sensors 108. As an example, one or more cameras 112 may be located within and/or around institution 102. For example, camera 112a may be configured to capture images and/or video 142 of users 104 when users 104 enter institution 102 through a front entrance of institution 102. Cameras 112 may also be positioned within institution 102 to capture images and/or videos 142 of users 104 when located at various positions within institution 102. For example, camera 112b may be configured to capture images and/or video 142 of users 104 when users 104 are interacting with a first teller at a first teller desk. In certain embodiments, one or more cameras 112 may be positioned within and/or around equipment that is associated with institution 102. For example, ATM 120 may include a camera 112 that is configured to capture images and/or video 142 of a user 104 while the user is interacting with the ATM. One or more cameras 112 may also be positioned around ATM 120 to capture images and/or videos 142 of users 104 approaching ATM 120. The images and/or videos 142 captured by cameras 112 are transmitted to security tool 122 for use by the tool, as described in detail below.

Notification devices 116 are used by individuals 114 to communicate with components of system 100. In certain embodiments, individuals 114 are employees/associates of institution 102 and/or law enforcement officials. Notification devices 116 may be used by individuals 114 to notify security tool 122 of security breaches that have occurred within institution 102 and/or have affected equipment associated with institution 102 (e.g., ATMs 120), and/or to receive alerts 144 from security tool 122 of potential security threats to institution 102. As an example, in certain embodiments, notification devices 116 are used by employees and/or associates 114 to transmit event indications 148 to security tool 122. Event indications 148 include information about security breaches that occurred within institution 102 and/or affected equipment associated with institution 102 (e.g., ATMs 120). For example, an indication 148 may indicate that a security breach occurred at a specific time and at a specific location within institution 102. Similarly, an indication 148 may indicate that equipment associated with institution 102 was tampered with at a specific time.

As another example of the manner by which notification devices 116 may be used by individuals 114 to communicate with components of system 100, in certain embodiments, notification devices 116 are used by employees and/or associates 114 to receive alerts 144 from security tool 122. For example, in response to determining that a mobile device 106 that had previously been identified as being associated with a security breach is located within range 110a/b of sensor 108a/b, security tool 122 may transmit alert 144 to notification device 116, to alert employee/associate 114 of a potential security threat to institution 102. For instance, alert 144 may indicate that a mobile device 106 associated with a user 104 who previously opened an account using a fake identity is located within institution 102. As illustrated in FIG. 1B, in certain embodiments, alert 144 may include an image 118 of user 104 that was captured by camera 112 around the time at which user 104 committed the security breach. In response to receiving alert 144, notification device 116 may be configured to display image 118. Employee and/or associate 114 may use image 118 to identify user 104 within institution 102. In response to receiving alert 144, employee/associate 114 may decline to process any transactions requested by user 104 and/or act in any other suitable manner to protect the security of institution 102.

As a further example of the manner by which notification devices 116 may be used by individuals 114 to communicate with components of system 100, in certain embodiments, notification devices 116 are used by law enforcement officials 114 to receive alerts 144 from security tool 122. For example, in response to determining that a mobile device 106 that has previously been associated with a criminal activity is located within range 110a/b of sensor 108a/b, security tool 122 may transmit alert 144 to notification device 116, to alert a law enforcement official 114 to the potential presence of a wanted criminal 104 within institution 102 and/or near equipment 120. Law enforcement official 114 may be able to use this information to apprehend user 104 and/or to prevent user 104 from engaging in further security breaches.

Notification devices 116 include any appropriate device for communicating with components of system 100 over network 124. For example, notification devices 116 may be a telephone, a mobile phone, a computer, a laptop, a wireless or cellular telephone, a tablet, a server, an IoT device, and/or an automated assistant, among others. This disclosure contemplates notification devices 116 being any appropriate device for sending and receiving communications over network 124. Notification device 116 may also include a user interface, such as a display, a microphone, keypad, or other appropriate terminal equipment usable by user 114. In some embodiments, an application executed by a processor of notification device 116 may perform the functions described herein.

In certain embodiments, system 100 includes automated teller machine (ATM) 120. ATM 120 is an electronic device that enables users 104 to perform transactions with an institution 102, without directly interacting with staff 114 of institution 102. For example, user 104 may use ATM 120 to withdraw funds from an account held at institution 102, deposit funds into the account, transfer funds from the account to another account, and/or submit inquiries to institution 102. ATM 120 may be located within institution 102, or in a location remote from institution 102. For example, as illustrated in FIG. 1B, in certain embodiments, ATM 120 is located within a building separate from institution 102. In certain embodiments, ATM 120 includes sensor 108b. For example, sensor 108b may be housed within and/or coupled to the outer casing of ATM 120. In some embodiments, sensor 108b is separate from ATM 120 but located at a physical location near enough to ATM 120 such that ATM 120 is located within the range 122 of sensor 108b. In certain embodiments, ATM 120 includes a camera 112. Camera 112 may be configured to capture images and/or video 142 of users 104 while they are interacting with ATM 120 and/or otherwise located within the field of view of camera 112.

ATM 120 is configured to communicate with security tool 122 over network 124. As an example, in certain embodiments, ATM 120 is configured to transmit images and/or video 142 captured by camera 112 to security tool 122. As another example, in certain embodiments, ATM 120 is configured to receive alerts 144 from security tool 122. For example, in response to determining that a mobile device 106 that had previously been associated with a security breach is located within range 110b of sensor 108b, security tool 122 may transmit alert 144 to ATM 120. Alert 144 may include instructions to be performed by ATM 120 to protect ATM 120 from security threats. For example, alert 144 may include instructions for the ATM to (1) lock itself, thereby preventing users 104 from performing transactions using ATM 120, (2) generate an audible alarm, and/or (3) perform any other action that may help secure ATM 120 against security threats.

Network 124 facilitates communication between and amongst the various components of system 100. This disclosure contemplates network 124 being any suitable network operable to facilitate communication between such components. Network 124 may include any interconnecting system capable of transmitting audio, video, signals, data, messages, or any combination of the preceding. Network 124 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 126 corresponds to any storage system that is configured to store a set of mobile device identifiers 128a through 128n. As described above, each identifier 128 may be an International Mobile Subscriber Identity (IMSI), an International Mobile Equipment Identity (IMEI), a phone number, a media access control (MAC) address, and/or any other suitable identifier. Each mobile device identifier 128a through 128n is associated with one or more security breaches, and was obtained from a mobile device 106 that was located in the vicinity of the security breach when it occurred, as determined, for example, by security tool 122. In certain embodiments, database 126 may also store images 130a through 130n. Each image 130a through 130n is associated with a mobile device identifier 128a through 128n and corresponds to an image of the user 104 of the mobile device 106 to which the mobile device identifier 128 belongs, that was captured by a camera 112 around the time that the security breach occurred. In certain embodiments, database 126 may store additional information such as the type of security breach to which the mobile device identifier 128 is associated.

In certain embodiments, security tool 122 is configured to add identifiers 128 and/or images 130 to database 126. For example, in certain embodiments, security tool 122 may add identifier 128 to database 126 in response to determining that a user 104 of the mobile device 106 to which identifier 128 belongs committed a security breach within institution 102, as described in further detail below, in the discussion of FIG. 2. In some embodiments, multiple security tools 122 may add identifiers 128 to database 126. For example, database 126 may be shared by several different institutions 102. Each institution 102 may have its own security tool 102, which may add identifiers 128 to database 126. In certain embodiments, database 126 may be an external database. For example, database 126 may be operated by a law enforcement agency and may include identifiers 128a through 128n of mobile devices 106 belonging to known criminals and/or individuals with criminal records.

Database 126 may be a centralized database, a distributed database, a relational database, a non-relational database, a cloud-based database, and/or any other suitable type of database. Database 126 may store identifiers 128a through 128n in any suitable manner. For example, in certain embodiments in which identifiers 128a through 128n are numbers, database 126 may store identifiers 128a through 128n in ascending or descending order. This may allow for efficient searching of database 126.

As illustrated in FIG. 1A, security tool 122 includes processor 132 and memory 134. This disclosure contemplates processor 132 and memory 134 being configured to perform any of the functions of security tool 122 described herein. For example, processor 132 may execute instructions 136 stored in memory 134 to perform any of the functions described above. In particular, during a first mode of operation, processor 132: (1) receives a mobile device identifier 140a obtained by sensor 108, along with times at which the corresponding mobile device 106 was located within the range of sensor 108 and/or locations 146 of the corresponding mobile device 106 while within the range of sensor 108; (2) stores identifier 140a along with the corresponding time and/or location information 146 in log 138; (3) receives an indication 148 of a event occurring at a specified time and/or location within the range of sensor 108; (4) determines, based on the information stored in log 138, that mobile device identifier 140a is associated with the event; and (5) stores identifier 140a in database 126, to indicate that the user 104 of the mobile device 106 to which identifier 140a belongs poses a security threat to institution 102. Further details of this first mode of operation are provided below, in the discussion of FIG. 2.

During a second mode of operation, processor 132: (1) receives a mobile device identifier 140b obtained by sensor 108; (2) determines whether or not mobile device identifier 140b is stored in database 126 as one of mobile device identifiers 128a through 128n; and (3) in response to determining that mobile device identifier 140b is stored in database 126, initiates a security protocol designed to protect institution 102 from security threats posed by the user 104b of the mobile device 106b to which mobile device identifier 140b corresponds. Further details of this second mode of operation are provided below, in the discussion of FIG. 3. While illustrated in FIG. 1A as including a single processor 132 and a single memory 134, security tool 122 may include any number of processors 132 and memories 134. For example, security tool 122 may include a first processor 132 and a first memory 134 configured for the first mode of operation of security tool 122 and a second processor 132 and a second memory 134 configured for the second mode of operation of security tool 122.

Processor 132 is any electronic circuitry, including, but not limited to central processing unit(s) (CPUs), graphics processing unit(s) (GPUs), microprocessors, application specific integrated circuits (ASIC), application specific instruction set processor (ASIP), and/or state machines, that communicatively couples to memory 134 and controls the operation of security tool 122. Processor 132 may be 8-bit, 16-bit, 32-bit, 64-bit or of any other suitable architecture. Processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 132 may include other hardware and software that operates to control and process information. Processor 132 executes software stored on memory to perform any of the functions described herein. Processor 132 controls the operation and administration of security tool 122 by processing information received from device(s) 106, sensor(s) 108, cameras 112, notification devices 116, ATM 120, network 124, database 126, and/or memory 134. Processor 132 may be a programmable logic device, a microcontroller, a microprocessor, any suitable processing device, or any suitable combination of the preceding. Processor 132 is not limited to a single processing device and may encompass multiple processing devices.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 134, a disk, a CD, or a flash drive. In particular embodiments, the software may include an application executable by processor 132 to perform one or more of the functions described herein.

Memory 134 may also store log 138. Log 138 includes a set of identifiers 140 belonging to mobile devices 106 that were located within the range of sensor 108. In certain embodiments, log 138 may also includes times at which the mobile devices 106 associated with identifiers 140 were located within the range of sensor 108 and/or the locations 146 of the mobile devices 106 within the range of sensor 108. In some embodiments, log 138 may also store images 142 of the users 104 of the mobile devices 106 to which identifiers 140 correspond. Images 142 may have been captured by cameras 112 while users 104 were located within the range of sensor 108. Log 138 may store identifiers 140 in any suitable manner. For example, in certain embodiments, log 138 may store identifiers according to given time intervals. For instance, log 138 may store a first set of identifiers 140 according to a first time interval from 8 am to 9 am, where each corresponding mobile device 106 was located within the range of sensor 108 at some point in time between 8 am and 9 am. Similarly, log 138 may store a second set of identifiers 140 according to a second time interval from 9 am to 10 am, where each corresponding mobile device 106 was located within the range of sensor 108 at some point in time between 9 am and 10 am. This may help enable security tool 122 to efficiently identify those mobile devices 106 associated with security breaches. For example, if security tool 122 receives an indication 148 that a security breach occurred within the range of sensor 108 at 9:45 am, security tool 122 may consult the second set of identifiers 140, stored according to the second time interval from 9 am to 10 am, in an attempt to identify a mobile device 106 associated with the security breach.

In certain embodiments, memory 134 may additionally store known identifiers 150. Known identifiers 150 may include identifiers belonging to employees/associates 114 of institution 102, and/or other trusted individuals. Known identifiers 150 may be used by security tool 122 when identifying mobile devices 106 associated with security breaches, as described in further detail below, in the discussion of FIG. 2.

Modifications, additions, or omissions may be made to the systems described herein without departing from the scope of the invention. For example, system 100 may include any number of users 104, devices 106, sensors 108, cameras 112, notification device users 114, notification devices 116, ATMs 120, networks 124, and databases 126. The components may be integrated or separated. Moreover, the operations may be performed by more, fewer, or other components. Additionally, the operations may be performed using any suitable logic comprising software, hardware, and/or other logic.

II. Generating a Database of Mobile Devices Associated with Security Threats

Figure 2:
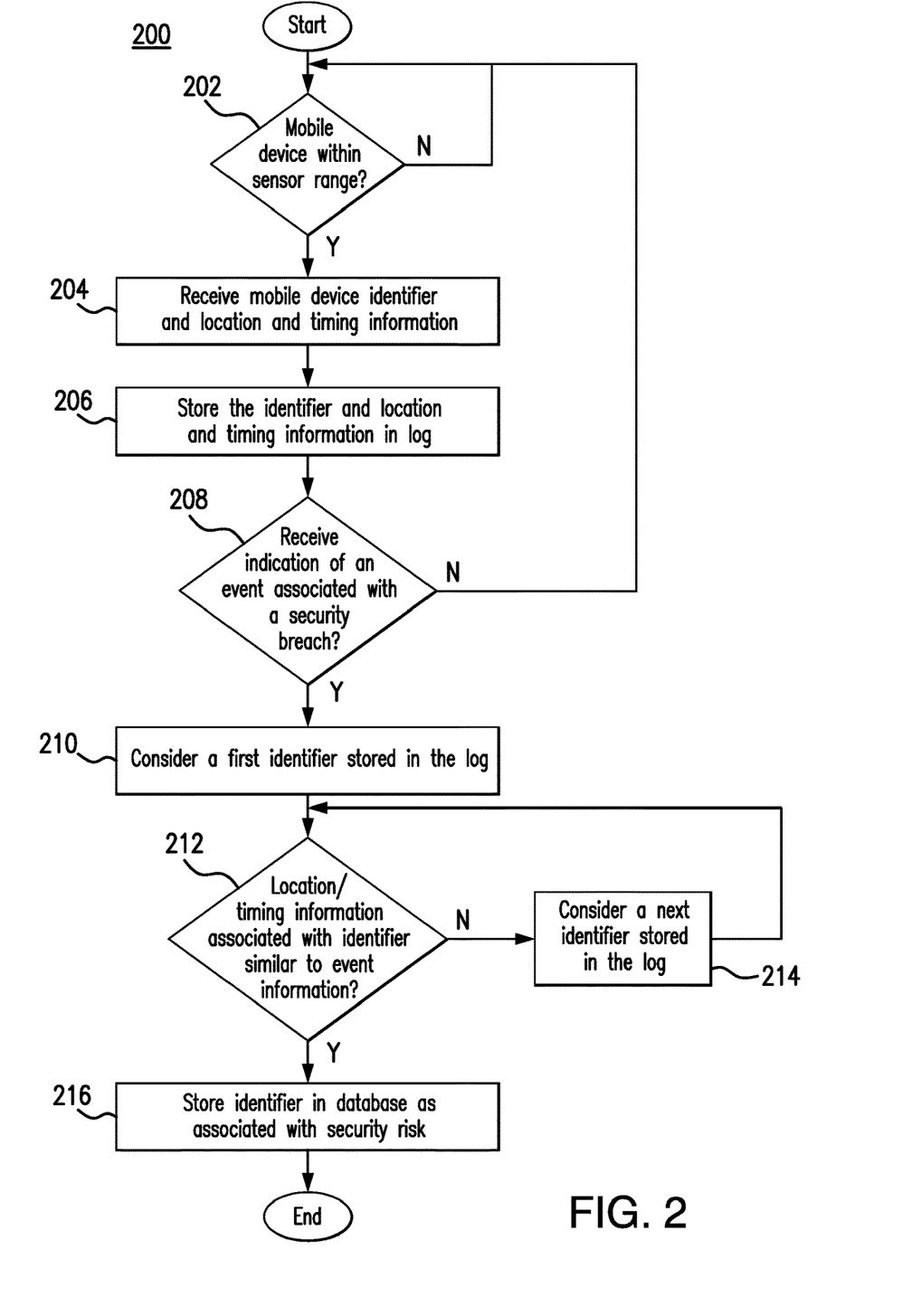
FIG. 2 presents a flowchart illustrating an example process by which the security tool of the system presented in FIG. 1A generates a database of mobile devices that are associated with security threats.

FIG. 2 presents a flowchart (described in conjunction with elements of FIGS. 1A and 1B) illustrating an example method 200 by which security tool 122 generates a database 124 of mobile devices 106 that are associated with security threats to institution 102.

In step 202 sensor 108 determines whether or not a mobile device 106a is located within the range of the sensor. If, in step 202 sensor 108 determines that mobile device 106a is located within the range of the sensor, sensor 108 obtains identifier 140a belonging to mobile device 106a. Sensor 108 may also obtain the times at which mobile device 106a is located within the range of the sensor and/or the locations 146 of mobile device 106a within the range of the sensor. Sensor 108 then communicates identifier 140a, along with the timing and location information 146 to security tool 122. In step 204 security tool 122 receives identifier 140a along with the timing/location information 146 from sensor 108. In step 206 security tool 122 stores identifier 140a along with the timing/location information 146 in log 138. In certain embodiments, prior to storing identifier 140a in log 138, security tool 122 first determines whether or not identifier 140a is stored in the set of known identifiers 150. If security tool 122 determines that identifier 140a is stored in the set of known identifiers 150, security tool 122 may decline to store identifier 140a in log 138, because identifier 140a belongs to a trusted device. In some embodiments, security tool 122 stores all received identifiers 140 in log 138, regardless of whether or not they exist within the set of known identifiers 150.

In step 208 security tool 122 determines whether it has received an indication 148 that an event associated with a security breach has occurred. Indication 148 may indicate that a user 104: (1) cashed a forged check; (2) opened/attempted to open an account using a fake identity; (3) impersonated/attempted to impersonate an account holder; (4) tampered with an ATM 120; (5) used a stolen ATM card at an ATM 120; (6) committed a robbery at an ATM 120; and/or (7) committed any other type of security breach associated with institution 102. In certain embodiments, security tool 122 may receive indication 148 from notification device 116. For example, an employee/associate 114 of institution 102 may use notification device 116 to alert security tool 122 to a security breach that occurred within institution 102 and/or to equipment (e.g. ATM 120) associated with institution 102. In some embodiments, security tool 122 may generate indication 148 itself. For example, in certain embodiments, security tool 122 may analyze images and/or videos 142 received from cameras 112 to determine that a security breach occurred. As an example, in certain embodiments, instructions 136 stored in memory 134 of security tool 122 may include one or more machine learning algorithms trained to identify security breaches based on images and/or videos 142 captured while the security breach was occurring. For instance, such a machine learning algorithm may be trained based on a set of images and/or videos that depict known security breaches to identify features within images and/or videos 142 captured by cameras 112 that are indicative of security breaches. Indication 148 may include any suitable information about the identified security breach. For example, indication 148 may include the time at which the security breach occurred, the location at which the security breach occurred, and/or any other suitable information about the security breach.

If, in step 208 security tool 122 received an indication 148 that an event associated with a security breach has occurred, in step 210, security tool 122 considers a first identifier 140 stored in log 138. In step 212 security tool 122 determines whether the timing and/or location information stored along with identifier 140 in log 138 indicates that the mobile device 106 corresponding to identifier 140 was likely present at the location of the security breach, while the breach was occurring (and, accordingly, may have been in the possession of the perpetrator of the security breach). As an example, security tool 122 may determine that the mobile device 106 corresponding to identifier 140 was likely at the location of the security breach while it was occurring, if log 138 indicates that mobile device 106 was located within the range of sensor 108 at a given time that is within a threshold of the time at which the security breached occurred. As another example, security tool 122 may determine that the mobile device 106 corresponding to identifier 140 was likely at the location of the security breach while it was occurring, if log 138 indicates that mobile device 106 was located at a given location within the range of sensor 108 at a given time, where the given location is within a given threshold distance of the location of the security breach and the given time is within a threshold of the time at which the security breached occurred. If, in step 212 security tool 122 determines that the mobile device 106 corresponding to identifier 140 was likely not present at the location of the security breach while it occurred, in step 214 security tool 122 considers a next identifier 140 stored in log 138. Method 200 then returns to step 212.

If, in step 212 security tool 122 determines that the mobile device 106 corresponding to identifier 140 was likely present at the location of the security breach while it occurred, in certain embodiments, security tool 122 stores identifier 140 in database 126 as a mobile device identifier 128 that is associated with a security threat, in step 216. In certain embodiments, security tool 122 also stores an image 142 of the user of the mobile device 106 in database 126, as an image 130 of a user 106 who is associated with the security threat. In some embodiments, before storing identifier 140 in database 126, security tool 122 determines whether identifier 140 is stored in the set of known identifiers 150. If security tool 122 determines that identifier 140 is stored in the set of known identifiers 150, security tool 122 may decline to store identifier 140 in database 126. This may occur, for example, when an employee 114 of institution 102 is present at the time and location of a security breach that was committed by user 104. For instance, user 104 may have submitted a forged check to employee 114.

Modifications, additions, or omissions may be made to method 200 depicted in FIG. 2. Method 200 may include more, fewer, or other steps. For example, steps may be performed in parallel or in any suitable order. While discussed as sensor 108 and security tool 122 (or components thereof) performing the steps, any suitable component of system 100, such as device(s) 106 and/or notification device(s) 116, for example, may perform one or more steps of the method.

III. Identifying and Responding to Security Threats

Figure 3:
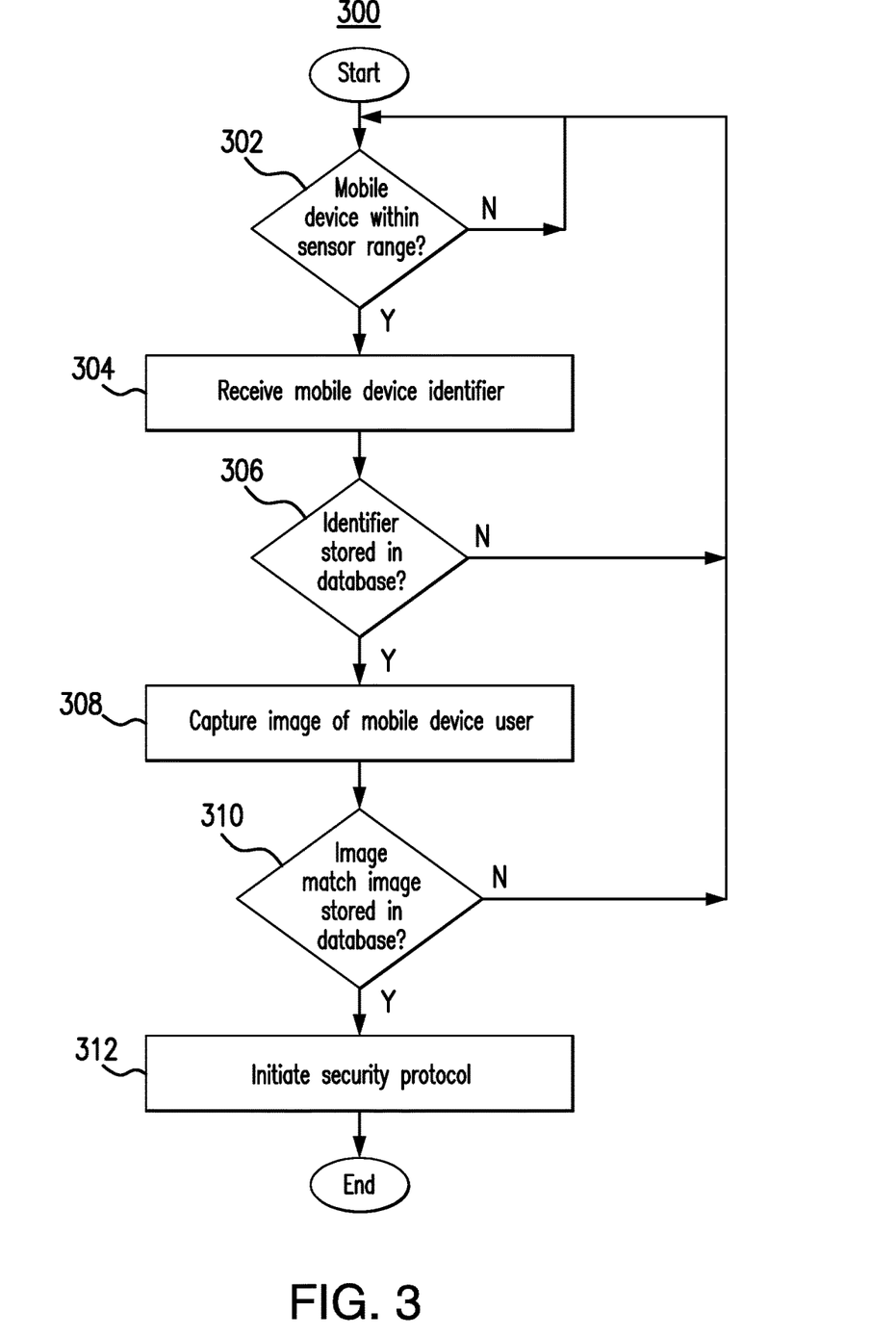
FIG. 3 presents a flowchart illustrating an example process by which the security tool of the system presented in FIG. 1A monitors for the presence of mobile devices that are associated with security threats and initiates a security protocol in response to detecting any such device.

FIG. 3 presents a flowchart (described in conjunction with elements of FIGS. 1A and 1B) illustrating an example method 300 by which security tool 122 monitors an institution 102 for the presence of mobile devices 106 that are associated with security threats and initiates a security protocol in response to detecting any such device.

In step 302 sensor 108 determines whether or not a mobile device 106b is located within the range of the sensor. If, in step 302 sensor 108 determines that mobile device 106b is located within the range of the sensor, sensor 108 obtains identifier 140b belonging to mobile device 106b. Sensor 108 then communicates identifier 140b to security tool 122. In step 304 security tool 122 receives identifier 140b from sensor 108. In step 306 security tool 122 determines whether identifier 140b is stored in database 126.

If, in step 306 security tool 122 determines that identifier 140b is stored in database 126 (for example, as identifier 128a), in step 308 security tool 122 receives an image 142 of user 104b of mobile device 106b captured by a camera 112. In step 310 security tool 122 determines whether image 142 depicts the same individual as depicted by image 130a, which is stored in database 126 as corresponding to the user 104b of mobile device 106b (e.g., an individual who is associated with a previous security breach). Security tool 122 may determine whether image 142 depicts the same individual as depicted by image 130a in any suitable manner. For example, in certain embodiments, security tool 122 determines whether image 142 matches image 130a using facial recognition software stored as instructions 136 in memory 134. Determining whether image 142 depicts the same individual as depicted by image 130a may help prevent security tool 122 from generating false alarms. As an example, even though mobile device 106b may have been in the possession of user 104b while he/she perpetrated a security breach, he/she may not have owned device 106b. For example, user 104b may have borrowed mobile device 106b from another individual. As another example, even though mobile device 106b may have been in the possession of user 104b while he/she perpetrated the security breach, he/she may have since sold the device to another individual.

If, in step 310 security tool 122 determines that image 142 depicts the same individual as depicted by image 130a, which is stored in database 126 as corresponding to the user 104b of mobile device 106b, in step 312 security tool 122 initiates one or more security protocols. As an example, in certain embodiments in which mobile device 106b is located near ATM 120, security tool 122 transmits an alert 144 to ATM 120. In certain embodiments, alert 144 instructs ATM 120 to lock itself, thereby preventing user 106b of device 104b from using ATM 120 to perform any transactions. In some embodiments, alert 144 instructs ATM 120 to generate an audible alarm. As another example, in certain embodiments, security tool 122 transmits alert 144 to notification device 116 operated by an employee/associate 114 of institution 102. Alert 144 may notify employee/associate 114 of a potential security threat to institution 102 and/or equipment 120 associated with institution 102. In certain embodiments, alert may include image 130a, which is stored in database 126 as corresponding to the user 104b of mobile device 106b (e.g., an individual who is associated with a previous security breach). In some embodiments, in response to receiving alert 144, notification device 116 may display image 130a on a screen of device 116, as image 118. Employee/associate 114 may view image 118 on device 116 and use it to identify user 104b within institution 102. In response to receiving alert 144, employee/associate 114 may decline to process any transactions requested by user 104b and/or act in any other suitable manner to protect the security of institution 102. As a further example of a security protocol that may be initiated by security tool 122, in certain embodiments, security tool 122 transmits alert 144 to a notification device 116 operated by a law enforcement official 114. Alert 144 may notify law enforcement official 114 of the potential presence of a wanted criminal 104b within institution 102 and/or near equipment 120. Law enforcement official 114 may be able to use this information to apprehend user 104b and/or to prevent user 104b from engaging in further security breaches.

Modifications, additions, or omissions may be made to method 300 depicted in FIG. 3. Method 300 may include more, fewer, or other steps. For example, steps may be performed in parallel or in any suitable order. While discussed as security tool 122 (or components thereof) performing the steps, any suitable component of system 100, such as device(s) 106, sensor(s) 108, and/or notification device(s) 116, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
a database;
a first sensor having a range, the first sensor configured to obtain an identifier transmitted by a mobile device when the mobile device is located within the range of the first sensor, wherein the identifier is assigned to the mobile device;
an automated teller machine (ATM) comprising a second sensor, the second sensor configured to obtain the identifier transmitted by the mobile device when the mobile device is located within a range of the ATM; and
a hardware processor communicatively coupled to the first sensor and the second sensor, the hardware processor configured to:
 receive the identifier from the first sensor, wherein the mobile device was located within the range of the first sensor at a first time;
 store the identifier and the first time in a log; receive an indication that an event associated with a security breach took place within the range of the first sensor at a particular time, the particular time within a given tolerance of the first time;
 in response to receiving the indication, determine, based at least in part on the particular time and the presence of the identifier and the first time in the log, that a user of the mobile device is associated with the event; and
 in response to determining that the user of the mobile device is associated with the event, store the identifier in the database, wherein the presence of the identifier in the database indicates that the user of the mobile device is associated with a security threat;
 receive the identifier from the second sensor at a second time later than the first time;
 in response to receiving the identifier from the second sensor, determine that the identifier is stored in the database; and in response to determining that the identifier is stored in the database, transmit a signal to the ATM instructing the ATM to lock itself, wherein in response to receiving the signal the ATM is configured to decline to process user requests.

2. The system of claim 1, wherein:
the first sensor is further configured to obtain a set of coordinates of the mobile device when the mobile device is located within the range of the first sensor;
the hardware processor is further configured to store the set of coordinates of the mobile device in the log;
the indication further indicates that the event occurred at a location within the range of the first sensor; and
determining that the user of the mobile device is associated with the event is further based on a comparison between the set of coordinates of the mobile device and the location.

3. The system of claim 1, wherein:
a second automated teller machine (ATM) is located within the range of the sensor; and
the indication of the event indicates at least one of:
an individual tampered with the second ATM;
a stolen debit card was used at the second ATM; and
a robbery took place at the second ATM.

4. The system of claim 1, further comprising a camera communicatively coupled to the hardware processor, the camera configured to capture an image of the user of the mobile device, when the mobile device is located within the range of the first sensor, wherein:
the hardware processor is further configured to:
store the image of the user in the log; and
in response to determining that the user of the mobile device is associated with the event, store the image of the user in the database.

5. The system of claim 1, wherein the mobile device is configured to transmit the identifier over the wireless network while requesting to join the wireless network.

6. The system of claim 1, wherein obtaining the identifier comprises at least one of:
intercepting the identifier prior to the identifier reaching a network base station, wherein the mobile device transmitted the identifier to the network base station; and
receiving the identifier from the mobile device, wherein:
the first sensor comprises a virtual base station configured to:
receive a connection request transmitted to the virtual base station from the mobile device, the connection request comprising the identifier;
obtain the identifier from the connection request; and
in response to obtaining the identifier from the connection request, forward the connection request to the network base station.

7. The system of claim 1, wherein:
the range of the second sensor does not overlap with the range of the first sensor;
and
in response to receiving the identifier from the second sensor, the hardware processor is further configured to:
generate an alert indicating that the user of the mobile device is associated with the security threat.

8. A method comprising:
obtaining, using a first sensor, an identifier transmitted by a mobile device, the identifier assigned to the mobile device and obtained by the first sensor when the mobile device is located within a range of the first sensor, wherein the mobile device was located within the range of the first sensor at a first time;
storing the identifier and the first time in a log; receiving an indication that an event associated with a security breach took place within the range of the first sensor at a particular time, the particular time within a given tolerance of the first time;
in response to receiving the indication, determining, based at least in part on the particular time and the presence of the identifier and the first time in the log, that a user of the mobile device is associated with the event;
in response to determining that the user of the mobile device is associated with the event, storing the identifier in a database, wherein the presence of the identifier in the database indicates that the user of the mobile device is associated with a security threat;
obtaining, using a second sensor, the identifier transmitted by the mobile device at a second time later than the first time, wherein:
an automated teller machine (ATM) comprises the second sensor; and
the second sensor is configured to obtain the identifier when the mobile device is located within a range of the ATM;
in response to obtaining, using the second sensor, the identifier, determining that the identifier is stored in the database; and
in response to determining that the identifier is stored in the database, transmitting a signal to the ATM instructing the ATM to lock itself, wherein in response to receiving the signal the ATM is configured to decline to process user requests.

9. The method of claim 8, further comprising:
obtaining a set of coordinates of the mobile device when the mobile device is located within the range of the first sensor; and
storing the set of coordinates of the mobile device in the log, wherein:
the indication further indicates that the event occurred at a location with the range of the first sensor; and
determining that the user of the mobile device is associated with the event is further based on a comparison between the set of coordinates of the mobile device and the location.

10. The method of claim 8, wherein:
a second automated teller machine (ATM) is located within the range of the sensor; and
the indication of the event indicates at least one of:
an individual tampered with the second ATM;
a stolen debit card was used at the second ATM; and
a robbery took place at the second ATM.

11. The method of claim 8, further comprising:
capturing an image of the user of the mobile device when the mobile device is located within the range of the first sensor;
storing the image of the user in the log; and
in response to determining that the user of the mobile device is associated with the event, storing the image of the user in the database.

12. The method of claim 8, wherein the mobile device transmitted the identifier over a wireless network while requesting to join the wireless network.

13. The method of claim 8, wherein obtaining the identifier comprises at least one of:
intercepting the identifier prior to the identifier reaching a network base station, wherein the mobile device transmitted the identifier to the network base station; and receiving the identifier from the mobile device, wherein:
the first sensor comprises a virtual base station configured to:
receive a connection request transmitted to the virtual base station from the mobile device, the connection request comprising the identifier;
obtain the identifier from the connection request; and
in response to obtaining the identifier from the connection request, forward the connection request to the network base station.

14. The method of claim 8,
wherein:
the range of the second sensor does not overlap with the range of the first sensor;
and
in response to determining that the identifier is stored in the database, the method further comprises generating an alert indicating that the user of the mobile device is associated with the security threat.

15. An apparatus comprising:
a memory configured to store a log; and
a hardware processor communicatively coupled to the memory, the hardware processor configured to:
receive an identifier from a first sensor, wherein:
the identifier is assigned to a mobile device;
the first sensor obtained the identifier from a transmission of the identifier by the mobile device while the mobile device was located within a range of the first sensor; and
the mobile device was located within the range of the first sensor at a first time;
store the identifier and the first time in the log; receive an indication that an event associated with a security breach took place within the range of the first sensor at a particular time, the particular time within a given tolerance of the first time;
in response to receiving the indication, determine, based at least in part on the particular time and the presence of the identifier and the first time in the log, that a user of the mobile device is associated with the event;
in response to determining that the user of the mobile device is associated with the event, store the identifier in to database, wherein the presence of the identifier in the database indicates that the user of the mobile device is associated with a security threat;
receive the identifier from a second sensor at a second time later than the first time, wherein:
an automated teller machine (ATM) comprises the second sensor; and
the second sensor is configured to obtain the identifier when the mobile device is located within a range of the ATM;
in response to receiving the identifier from the second sensor, determine that the identifier is stored in the database; and
in response to determining that the identifier is stored in the database, transmit a signal to the ATM instructing the ATM to lock itself, wherein in response to receiving the signal the ATM is configured to decline to process user requests.

16. The apparatus of claim 15, wherein:
the hardware processor is further configured to:
receive a set of coordinates of the mobile device, each coordinate of the set of coordinates obtained by the first sensor when the mobile device was located within the range of the first sensor; and
store the set of coordinates of the mobile device in the log, wherein:
the indication further indicates that the event occurred at a location within the range of the first sensor; and
determining that the user of the mobile device is associated with the event is further based on a comparison between the set of coordinates of the mobile device and the location.

17. The apparatus of claim 15, wherein:
a second automated teller machine (ATM) is located within the range of the first sensor; and
the indication of the event indicates at least one of:
an individual tampered with the second ATM;
a stolen debit card was used at the second ATM; and
a robbery took place at the second ATM.

18. The apparatus of claim 15, wherein the hardware processor is further configured to:
receive an image of the user of the mobile device, the image captured when the mobile device was located within the range of the first sensor;
store the image of the user in the log; and
in response to determining that the user of the mobile device is associated with the event, store the image of the user in the database.

19. The apparatus of claim 15, wherein the mobile device is configured to transmit the identifier over the wireless network while requesting to join the wireless network.

20. The apparatus of claim 15, wherein
the range of the second sensor does not overlap with the range of the first sensor; and
in response to receiving the identifier from the second sensor, the hardware processor is further configured to:
generate an alert indicating that the user of the mobile device is associated with the security threat.

* * * * *